(No Model.) 4 Sheets—Sheet 3.
W. A. G. SCHONHEYDER.
APPARATUS FOR MEASURING AND REGISTERING QUANTITIES OF LIQUID DRAWN FROM RECEPTACLES.

No. 548,276. Patented Oct. 22, 1895.

WITNESSES:
J. B. Bolton
H. van Oldennel

INVENTOR
William Anton Gottlieb Schonheyder
BY
Richardson
ATTORNEYS (No Model.) 4 Sheets—Sheet 4.
W. A. G. SCHONHEYDER.
APPARATUS FOR MEASURING AND REGISTERING QUANTITIES OF LIQUID DRAWN FROM RECEPTACLES.

No. 548,276. Patented Oct. 22, 1895.

WITNESSES:
E. B. Bolton
H. van Oldenneel

INVENTOR
William Anton Gottlieb Schonheyder
BY
Richardson
ATTORNEYS

UNITED STATES PATENT OFFICE.

WILLIAM A. G. SCHÓNHEYDER, OF LONDON, ENGLAND, ASSIGNOR TO THE ANGLO-AMERICAN OIL COMPANY, LIMITED, OF SAME PLACE.

APPARATUS FOR MEASURING AND REGISTERING QUANTITIES OF LIQUID DRAWN FROM RECEPTACLES.

SPECIFICATION forming part of Letters Patent No. 548,276, dated October 22, 1895.

Application filed February 28, 1895. Serial No. 540,128. (No model.)

*To all whom it may concern:*

Be it known that I, WILLIAM ANTON GOTTLIEB SCHÓNHEYDER, a citizen of Denmark, residing at No. 4 Rosebery Road, Clapham Park, London, in the county of Surrey, England, have invented certain new and useful Improvements in Apparatus for Measuring and Registering Quantities of Liquid Drawn from Receptacles, of which the following is a specification.

My invention relates to that description of apparatus wherein a vessel of definite capacity is adapted to be fitted to a main vessel or tank containing liquid, and is provided with valve appliances, whereby on the one hand the liquid is made to pass from the tank into the measuring-vessel so as to fill it, while the air is allowed to escape from the latter, and on the other hand the communication between the vessel and tank being closed the contents of the former are discharged while air is allowed to enter the vessel.

According to my present invention I construct such apparatus as I will proceed to describe with reference to the accompanying drawings, in which—

Figure 1:
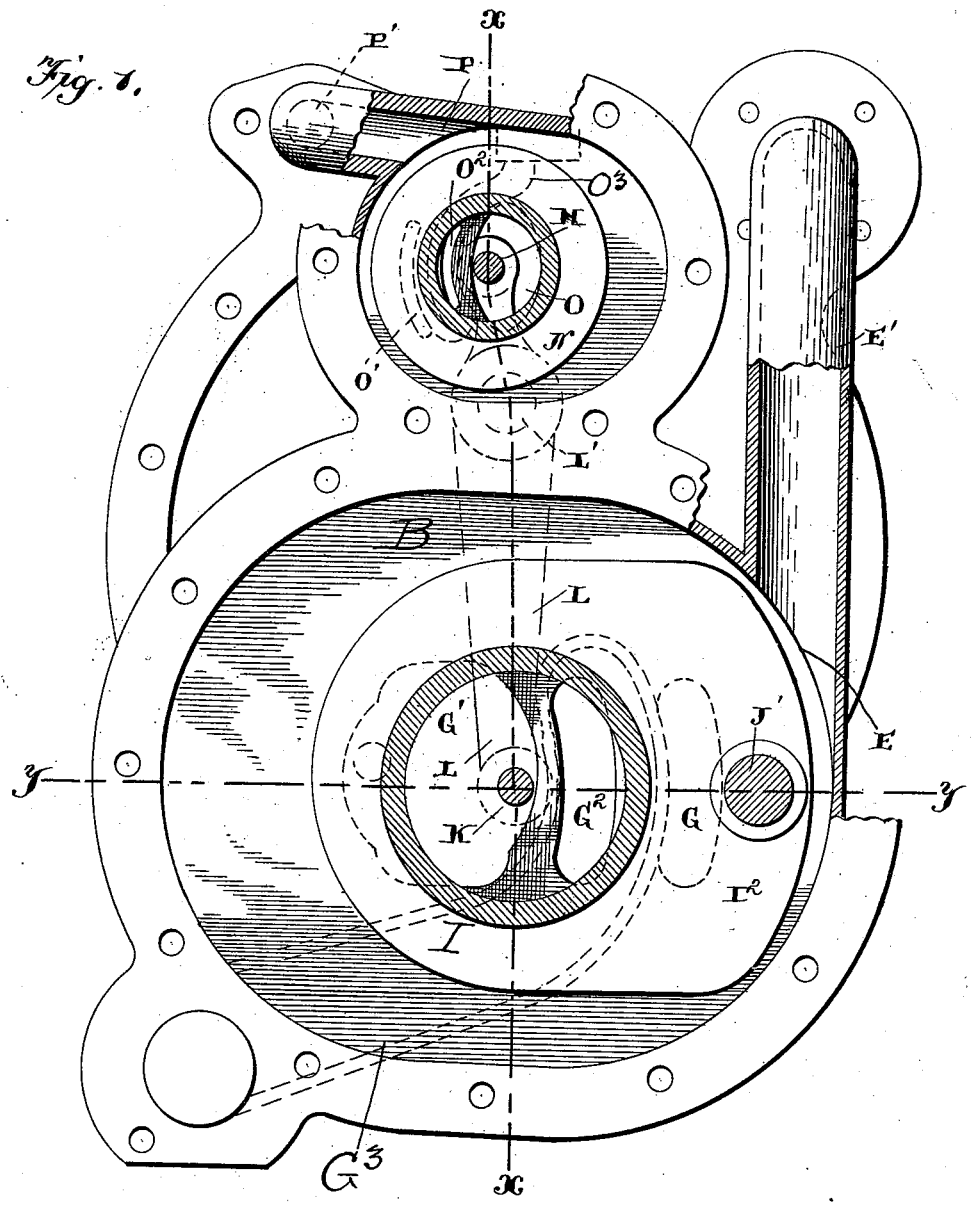
Figure 2:
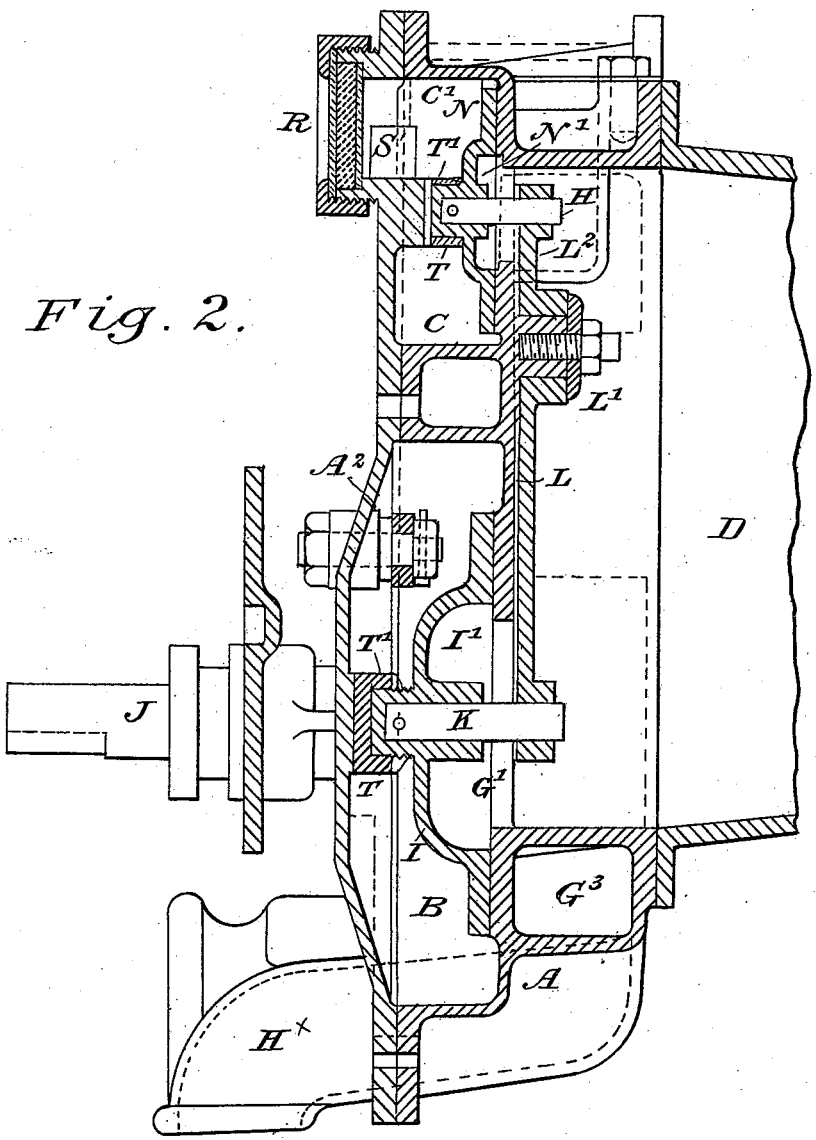
Figure 3:
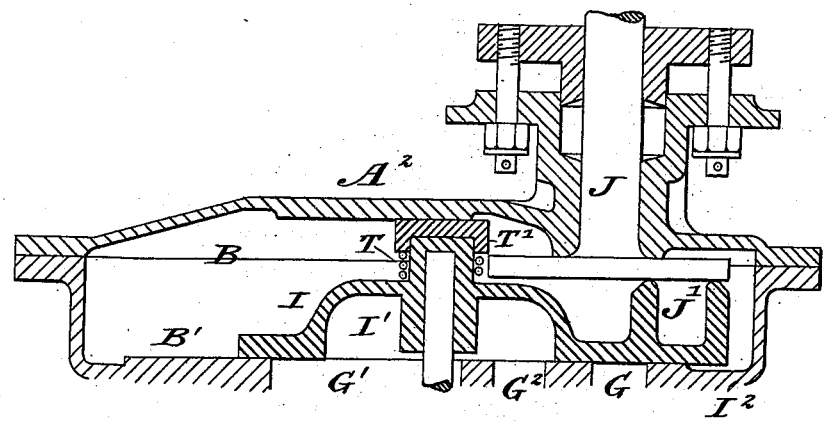
Figure 5:
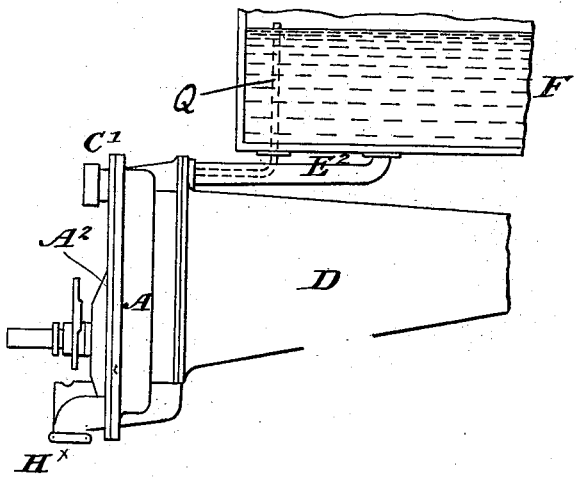

Figure 1 shows a front view partly in section. Fig. 2 shows a section on line X X; Fig. 3, a section on line Y Y, and Fig. 4 a back view. Fig. 5 shows a side view of the apparatus as attached to the measuring-vessel and tank.

Figure 4:
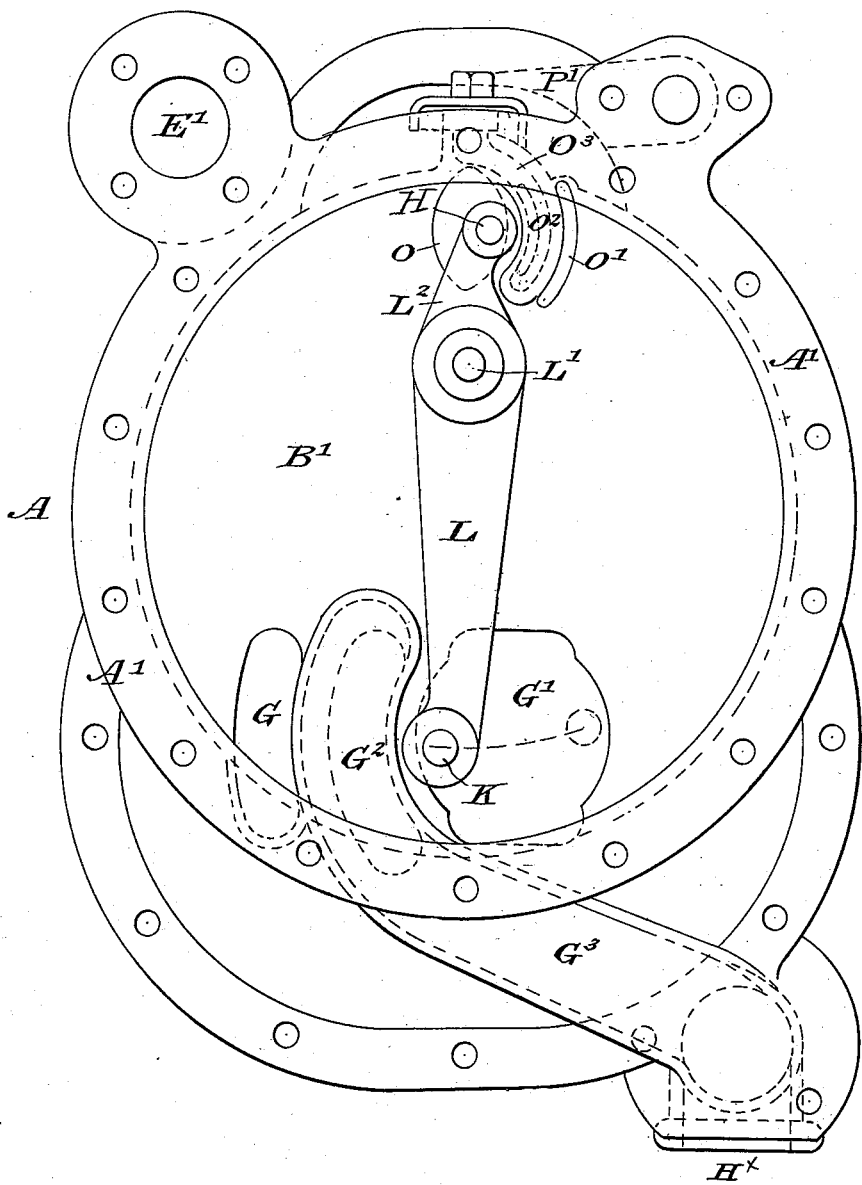

A casing A, containing a large valve-chamber B and a small one C, is attached to a measuring-vessel D, of conical or tapering form, as shown, so as to facilitate the discharge of liquid and air, the casing or head A being fixed to the vessel D by the circular face A', Fig. 4.

The large chamber B has, first, an opening E in its side communicating by a passage E' and pipe $E^2$ with the tank F, containing the liquid of which measured quantities are to be discharged. By means of the said pipe and passage, consequently, the chamber B is always kept full of liquid. Secondly, this chamber has in its flat bottom B' two openings G G', communicating directly with the measuring-vessel D, and between these another opening $G^2$, communicating with a passage $G^3$, leading to a discharge-spout $H^\times$.

On the faced bottom surface surrounding the openings G G' $G^2$ rests a slide-valve I, which is kept at all times pressed fluid-tight upon the said face by the pressure transmitted from the head of liquid in the reservoir to that in the chamber B. This valve has a cavity I', so formed that in one position of the valve it establishes a communication between the openings G' and $G^2$, so that liquid can flow off from the vessel D through the discharge-spout $H^\times$, while at the same time the flange $I^2$ of the valve closes the opening G. This position of the valve is shown in the lower half of Fig. 1 at the right-hand limit of its stroke. When at the left-hand limit of its stroke, the valve I uncovers the opening G, so that liquid can flow from the tank F through the chamber B into the measuring-vessel, while the flange of the valve closes the communication between G' and $G^2$.

The requisite motion is imparted to the valve for bringing it into either of these positions by means of a spindle J, passing through a stuffing-box in the cover $A^2$, which is turned by a suitable key or crank-handle, and which has a crank on its inner end, the pin J' of which enters a socket in the valve-flange $I^2$. Thus by the motion of the slide-valve the measuring-vessel D is alternately filled with a definite quantity of liquid from the tank and has that quantity discharged.

The slide-valve carries a pin K, extending inward through the opening G' and connected to one end of a double-ended lever L, pivoted at L' to the inner side of the casing A and having its other shorter arm $L^2$ pivoted to a pin H, carried by a second slide-valve N, contained in the second chamber C. This chamber also has three openings in its bottom face—namely, two O O' communicating with the vessel D, and a third $O^2$ communicating with a passage $O^3$ leading to the open air, Fig. 1. The chamber C also has a side opening P, leading to a passage P', communicating with a pipe Q, leading up through the tank F to above the highest level of the liquid therein; or the passage P' might merely open to the outer air.

The slide-valve N has a cavity N', which in the position shown in Fig. 1 establishes a communication between the openings O and O², and consequently puts the vessel D in communication with the outer air, the opening O' being at that time closed by the flange of the slide-valve. The valve is shown in Fig. 1 at the end of its stroke to the right. When brought into the position at the left-hand limit of its stroke, the valve uncovers the opening O' and consequently puts the vessel D in communication, through passage P' and pipe Q, with the upper air-space in the tank F, the communication between the openings O and O² being then cut off by the valve.

By the above-described lever connection between the valves I and N it will be seen that when the valve I is moved into the position in which it admits liquid from the main tank into the measuring-vessel the valve N will be in the last above-described position, in which, consequently, the air contained in the measuring-vessel D can escape through the uncovered opening O' in the valve-chamber C and through P' and Q into the main tank. When, on the other hand, the valve I is moved into the position for allowing the liquid to be discharged from the measuring-vessel, the valve N is moved into the position in which it establishes a communication between the vessel and the passage O³ leading to the outer air, so that air can now flow into the measuring-vessel so as to allow the liquid to flow out.

It will be seen that owing to its connection to the double-ended lever L the valve I, when actuated by the crank-pin J', will receive a compound longitudinal and lateral to-and-fro motion, which will effectually prevent any grooving, &c., of the valve-faces, and the small valve being circular and free to revolve is in a similar manner prevented from grooving.

When valve I is operated by the turning of the crank, the pivot K, controlled by the lever L, will move laterally along the arc of a circle; but the curve of this will be slight, and the swinging movement of the lever being limited said movement of the pivot K will be practically along a straight line, and as the valve is free to turn on this pivot-pin the other end of the valve will be swung up and down by the movement of the crank-pin; but the central chamber of the valve and the flanges are so proportioned as to cover or uncover the parts properly and sufficiently in all positions of the valve.

The valve-chamber C has at its upper part an enlargement C', the outer face of which is closed by a glass disk R, behind which is a small float S. When the measuring-vessel D is quite full of liquid, this will also enter and fill the valve-chamber C, thereby causing the float S to rise so that it will indicate to the attendant through the glass that the vessel is full. When the vessel is discharged and filling has recommenced, the small valve-chamber will quickly empty itself into the measuring-vessel, thereby allowing air to escape, as before mentioned, and the float will fall again.

The spindle J, actuating the valve I, is connected by suitable gear to any known form of counter for registering each successive discharge of the contents of the measuring-vessel.

The valves may be held on their seats by means of helical springs T T, bearing on the one hand against them and on the other hand against a sliding piece T' T', separate therefrom but traveling therewith, and that bears against the inner top surface of the valve-chamber.

When it is not desired to discharge the air from the measuring-vessel D into the tank F, the slide-valve chamber C, slide-valve N, and lever L can be dispensed with and the upper part of the measuring-chamber be simply provided with an air-pipe leading up to a height above that of the level of the liquid in the storage-tank.

Having now described the nature of my said invention and the best means I know for carrying the same into practical effect, I claim—

1. In apparatus for measuring and registering quantities of liquid drawn from receptacles, the combination with a measuring vessel of a casing or head containing first a slide valve and ports whereby the lower part of the said vessel can either be put in communication with a tank or reservoir of liquid so as to be filled therefrom, or be cut off therefrom and have its contents discharged, and secondly a slide valve and ports whereby the upper part of the vessel can either be put in communication with the air space of the reservoir or with the outer air, the said two slide valves being connected by a lever so that when the first named valve is in the position for filling the measuring vessel, the second valve is in position for discharging the air therefrom, and when the first named valve is in position for discharging the contents of the measuring vessel, the second valve is in position for admitting air thereto, the said slide valves being secured to opposite ends of the lever which is pivoted intermediate of its length to slide the valves in opposite directions, substantially as described.

2. In apparatus for measuring and registering quantities of liquid drawn from receptacles, the combination with a measuring vessel of a slide valve chamber such as B having a passage E E' leading to the main tank, two ports G and G' communicating directly with the said vessel, and a port G² communicating with a discharge passage, and a slide valve, such as I, the means for operating the slide valve consisting of the crank pin J' arranged to give said valve a compound longitudinal and lateral movement, so arranged that in one position it opens the port G so as to admit liquid into the measuring vessel and closes the communication between the ports G' and G², while in another position it closes the port G and opens the communication between ports G' and G² for discharging the contents of the vessel, substantially as described.

3. In apparatus for measuring and registering quantities of liquid drawn from receptacles the combination with a measuring vessel of a slide valve chamber such as C having ports O O' communicating directly with the said vessel, a port $O^2$ communicating with the outer air, and a port P P' leading to the air space of the main reservoir, and a slide valve such as N, so arranged that in one position it opens the port O' so that the air can escape from the measuring vessel into the main tank during the filling, while in another position it closes the said port and opens the communication between ports O and $O^2$ so as to allow the outer air to enter the measuring vessel during the emptying, said slide valve C being circular and cup shaped in form and connected centrally to the lever by a pivot pin about which the valve may turn, substantially as described.

In testimony whereof I have signed my name to this specification, in the presence of two subscribing witnesses, this 28th day of December, A. D. 1894.

WILLIAM A. G. SCHÖNHEYDER.

Witnesses:
JNO. P. M. MILLARD,
GERALD L. SMITH.